United States Patent [19]

Farrow

[11] E Re. 28,880

[45] Reissued June 29, 1976

[54] PRINTING MACHINES FEED MECHANISM

[75] Inventor: Harold Frederick Farrow, Hitchin, England

[73] Assignee: Colorflo Limited, Great Britain

[22] Filed: Feb. 19, 1971

[21] Appl. No.: 116,840

Related U.S. Patent Documents

Reissue of:

[64] Patent No.: 3,543,682
Issued: Dec. 1, 1970
Appl. No.: 744,068
Filed: July 11, 1968

[30] Foreign Application Priority Data

July 21, 1967 United Kingdom ..... 33735/67

[52] U.S. Cl. ..... 101/366; 91/422; 417/466; 417/469; 417/491; 417/495; 417/549

[51] Int. Cl.[2] ..... B41F 31/08; B41F 31/18

[58] Field of Search ..... 101/366; 417/466, 467, 417/468, 469, 487, 490, 491, 495, 497, 531, 547, 549, 554, 556, 501, 524, 526–528; 91/422

[56] References Cited

UNITED STATES PATENTS

| | | | |
|---|---|---|---|
| 215,170 | 3/1879 | Seymour et al. | 417/526 |
| 1,884,750 | 10/1932 | Koppelman et al. | 103/166.5 |
| 2,004,161 | 6/1935 | Fausel | 103/163 X |
| 2,143,885 | 1/1939 | Kline | 101/366 |
| 2,143,886 | 1/1939 | Kline | 101/366 |
| 2,261,468 | 11/1941 | Harter | 103/163 |
| 2,362,139 | 11/1944 | Kelly | 417/549 X |
| 2,616,524 | 11/1952 | Fox et al. | 417/501 X |
| 2,961,949 | 11/1960 | Sanderson | 101/163 |
| 2,971,458 | 2/1961 | Kumins et al. | 101/170 |
| 2,986,123 | 5/1961 | Augustin | 91/422 X |
| 3,194,155 | 7/1965 | Davis | 101/366 |
| 3,400,658 | 9/1968 | Gagliardi et al. | 101/170 |

FOREIGN PATENTS OR APPLICATIONS

| | | | |
|---|---|---|---|
| 6,701,075 | 7/1967 | Netherlands | 101/170 |
| 326,817 | 3/1930 | United Kingdom | 417/554 |

*Primary Examiner*—Clyde I. Coughenour

[57] ABSTRACT

The feed mechanism for a printing machine in which printing ink is fed into the recessed design of an intaglio printing plate includes a cylinder open at its upper end and communicating at its bottom with the recessed designs. A piston is housed in the cylinder, the lower end of which piston forms a chamber at the bottom of the cylinder. The piston rod extends above the cylinder and carries a support member at its upper end, the support member carrying a head. A second cylinder rests upon the top of the first cylinder and receives the head which is slidable therein within limits. A spring is interposed between the head and the bottom of the second cylinder. The piston and piston rod have a bore forming a second chamber provided at its upper end with an ink supply inlet. A hollow relief piston is slidable in the lower end of the bore communicating with the second chamber and communicating through inlet openings with the first chamber. A ball valve in the lower end of the relief piston is normally spring-biased to close the outlet passage of the relief piston, and a second spring in the bore above the relief piston normally urges the relief piston into position in which the ball valve closes communication between the first chamber and the opening in the bottom of the first cylinder. The piston rod is adapted to receive printing pressure whereby the chambers will be contracted by the application of pressure on the printing plate during printing, and will expand when such pressure is released, the chamber expansion causing a further supply of ink to be sucked into the chambers ready for the next printing operation; and the ball valve being closed automatically by application of said pressure.

7 Claims, 1 Drawing Figure

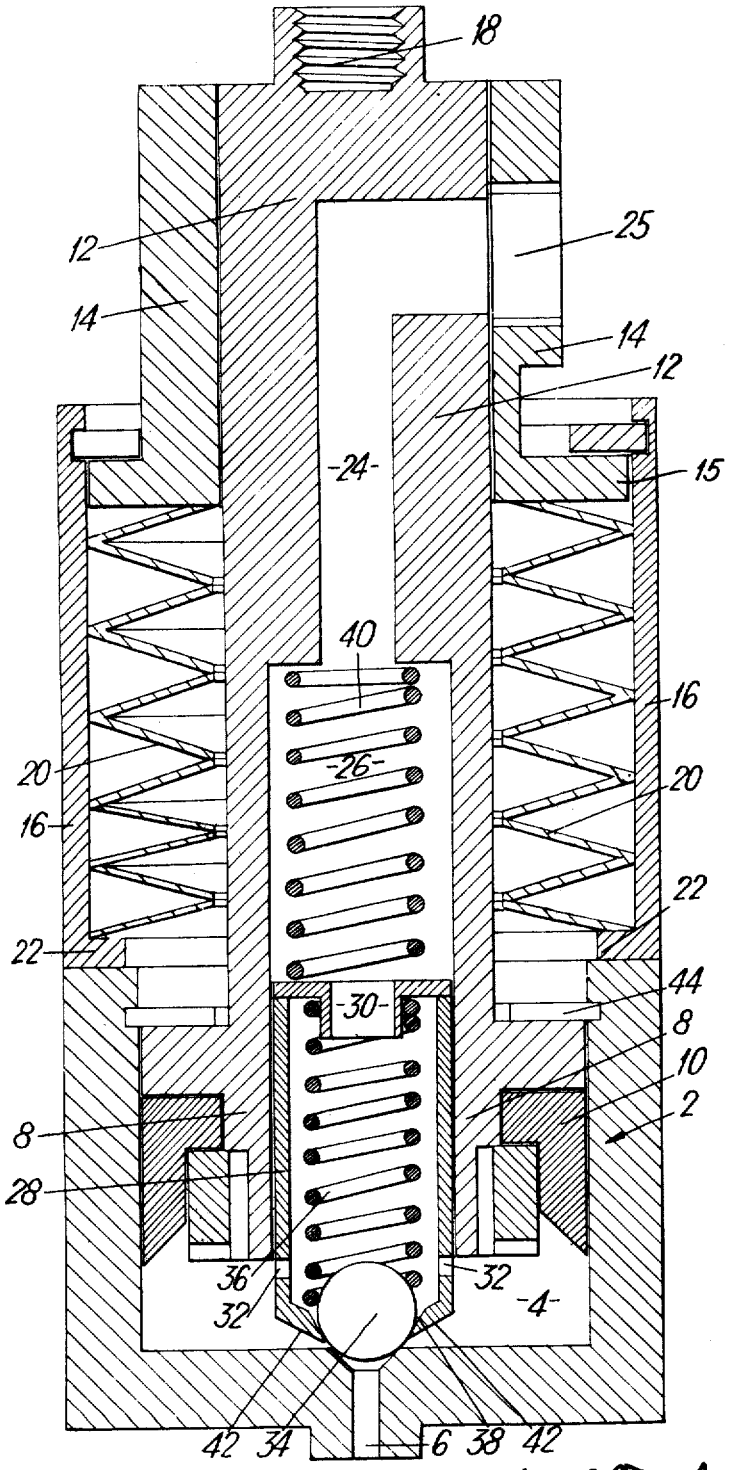
Inventor
Harold Frederick Farrow
By Dowell & Dowell
Attorneys

PRINTING MACHINES FEED MECHANISM

Matter enclosed in heavy brackets [ ] appears in the original patent but forms no part of this reissue specification; matter printed in italics indicates the additions made by reissue.

PRINTING MACHINES

This invention relates to intaglio printing plates and to printing machines of the type in which printing ink is fed into the recessed design or engraving of an intaglio printing plate through the thickness of the plate.

A problem arises with such plates as it is difficult properly to regulate the amount of ink fed through the plate in accordance with the printing requirements. Clearly it is very undesirable for either too much or too little ink to be fed and it is also essential to control the point in the printing cycle at which ink is fed to the plate.

These problems are satisfactorily solved by a printing machine in accordance with the invention which has an ink feed mechanism comprising one or more pump chambers arranged to be contracted by the application of pressure on the printing plate during printing and to expand when the printing pressure is released, each chamber having an outlet which communicates, when printing is taking place, with one or more ink passages extending through the printing plate and an inlet which communicates with an ink supply the inlet being controlled by a valve device which is closed automatically by the application of printing pressure to the printing plate and outlet being also controlled by a valve device which is normally closed but which is opened automatically by the application of further printing pressure for the printing plate after the inlet valve has been closed.

The inlet valve device is preferably arranged to be actuated by the displacement of the printing plate relatively to a support or the like forming part of the printing machine and from which the printing plate receives pressure preferably through the intermediary of a spring or springs. The outlet valve may be actuated by the hydraulic pressure of the printing ink generated by increased pressure in the chamber after the inlet valve has been closed.

With such a construction the initial application of printing pressure of the inlet valve causes ink to be driven from the pump chamber back to the supply but as the printing plate begins to receive the full printing pressure the inlet valve is closed and the outlet valve is open so that ink is forced through the printing plate only when the printing plate is being pressed onto the surface to be printed with a reasonable pressure. The printing surface is then printed with ink under pressure. When sufficient ink has been supplied to service the intaglio printing plate excess ink is returned to the supply by the opening of a pressure relief valve. The outlet valve closes as the plate is being lifted from the surface.

The printing chamber then expands so as to cause a further supply of printing ink to be sucked into the chamber ready for the next printing operation.

Each pump chamber may have a piston attached to a press plate and working in the chamber formed in a plate designed to carry the intaglio printing surface. Each chamber has one or more inlet openings adapted for connection to an ink supply and one or more outlet openings which communicate with one or more ink passages extending through the thickness of the printing plate and into the recessed design or engraving in the printing surface thereof. The printing plate has a limited movement towards and away from the support under the control of one or more springs which constantly tend to move the plate away from the support but allow the support to approach the plate and thereby compress the pump chamber when the pressure of the springs is overcome by the printing pressure applied.

Each inlet opening for the supply of ink communicates with its pump chamber through a port formed in an auxiliary "relief" piston which works in a cylindrical bore in the main piston. One end of this auxiliary piston carries a valve or valves which control the outlet opening or openings leading from the pump chamber to the recesses of the printing plate. The auxiliary piston is controlled by a spring which constantly tends to press the auxiliary piston inwards i.e. in a direction to close the outlet opening or openings.

An embodiment of one part of the ink feed mechanism of a printing machine in accordance with the invention will now be described by way of example with reference to the accompanying drawing which is a cross section through the mechanism.

The mechanism comprises a cylinder 2 the interior chamber 4 of which communicates with a recessed design or engraving on the printing surface of an intaglio printing plate (not shown) through a passage 6. A piston 8 works in the chamber 4 and is provided with a sliding seal member 10 to provide a seal between the piston and the chamber. The upper portion of the piston rod 12 is secured to a support member 14 having a head 15 which is arranged for limited sliding movement in a cylinder 16 which rests on the top of the walls of the cylinder 2. As pressure is applied to the piston rod during printing for example by means of a member secured at 18 to the piston rod, the member 14 moves down within the cylinder 16 compressing a spring 20 which is located between the head 15 of the member 14 and bottom wall 22 of the cylinder so as to apply pressure to the cylinder 2 through the spring 20.

The piston 8 and its rod 12 are formed with an internal passage 24 communicating at the upper end with an opening 25 through the member 14 for connection to a supply of printing ink. The lower portion of the passage 24 is of larger diameter to provide a cylinder 26 carrying a relief or auxiliary piston 28 which is hollow and which communicates with the chamber 26 through an opening 30 and with the chamber 4 through chamber inlet openings 32.

The piston 28 which is a sliding fit in the cylinder 26 carries a ball valve 34 at its lower end which is normally biased by means of a spring 36 within the piston to a position in which it closes the outlet passage 38 from the piston. The piston itself is biased by means of a spring 40, located within the cylinder 26 to a position in which the ball valve 34 closes communication between the chamber 4 and its outlet passage 6.

During use of the mechanism, printing pressure is applied by standard means (not shown) to the piston rod 12 and support member 14 causing through the spring 20 the printing plate 2 to be pressed against the surface to be printed. Further, pressure is applied to the printing ink in the chamber 4 by the piston 8 within the chamber. During the initial movement, the outlet 6 remains closed by the outlet valve 34 and the inlet valve 32 is open so that ink within the chamber 4 can flow back through the relief piston 28 and up through the passage 24 in the main piston to the ink supply. However, as the pressure increases and the piston 8 moves downwards in the chamber 4 over the relief piston 28, the head of the piston 8 acts as a valve device to close the ports 32 so that communication between the chamber 4 and the ink supply is cut off. By this time the printing plate is pressed firmly down on the printing surface and when the pressure in the chamber 4 has built up sufficiently the pressure acting on the tapered nose 42 of the relief piston 28 causes this piston to move up into the cylinder 26 against the pressure of the spring 40 so as to open the passage 6 through the printing plate to the chamber 4 allowing printing ink to reach the intaglio surface of the plate.

When sufficient ink has been supplied to service the intaglio plate excess ink is returned to the supply the passage 38 on lifting of the ball valve 34 from its seat by the excess pressure of the ink.

As the printing pressure is relaxed the pressure on the relief piston 28 within the chamber 4 is also relaxed allowing the spring 40 to move the piston back to the position in which the passage 6 is closed by the ball valve 34. In this position ink is no longer fed to the intaglio recess thus avoiding the possibility of excess ink being supplied as the plate is lifted from the surface which has just been printed.

As the pressure is further relaxed the spring 20 moves the main piston 8 upwardly within the chamber 4 to the position shown in the drawings in which it abuts against the stop 44 and as the chamber 4 is expanded and as the ports 32 are now open ink is drawn through the supply opening 25 the passage 24 the cylinder 26 and the opening 30 into the chamber 4 ready for the next printing operation.

Thus the ink required for printing is controlled automatically.

It will be appreciated that a number of chambers and pistons such as that described and illustrated in the drawings would normally be provided for a single printing plate.

The spring 20 which is used to apply pressure to the printing plate could of course be replaced by subsidiary pistons and cylinders coupled to a hydraulic accumulator.

The mechanism can be used for example to feed colored paint or the like rather than colored ink into different parts of an intaglio surface each chamber being supplied with paint of one particular color so that colored patterns can be printed. Alternatively two or more pump units such as that described can be connected to a common outlet into an intaglio relief so that by using different colors of ink or paint one for each pump unit, marbled effects can be obtained.

Equally adhesives could be used instead of paint or colored printing inks, as could thermoplastic material.

If a plate is supplied with more than one pump unit then the outlets from the chambers of each unit can be made of different cross sections so that the quantity of each colored ink or paint can be regulated.

I claim:

1. A feed mechanism for the type of printing machine in which printing ink is fed into the recessed design of an intaglio printing plate through the thickness of said plate, comprising a cylinder open at its upper end and having its bottom adapted to communicate with said recessed design; a piston in said cylinder forming with the bottom of the cylinder an ink chamber; a piston rod for the piston extending above the cylinder; a head carried by the upper end of the piston rod; a second cylinder disposed upon the first cylinder and slidably receiving said head; a spring interposed between said head and the bottom of said second cylinder; said piston and piston rod having a bore therein forming a second ink chamber adapted to communicate with an ink supply; a hollow relief piston slidable in the lower end of said bore communicating at its top with the second chamber and also communicating through lateral openings with the first chamber when the relief piston is projected to expose said openings below the first piston; a ball valve in the lower end of the relief piston and cooperating with a valve seat and normally spring-biased to close the lower end of the relief piston; and a second spring in said bore above the relief piston normally urging the relief piston into position in which the ball valve closes communication between the first chamber and the opening in the bottom of the first cylinder; said piston rod being adapted to receive printing pressure, whereby said chambers will be contracted by the application of pressure on the printing plate during printing, and will expand when such pressure is released, thereby causing a further supply of ink to be sucked into the chambers ready for the next printing operation.

*2. A feed mechanism for the type of machine in which fluid is fed into the recessed design of an intaglio plate through the thickness of said plate so that the fluid is deposited on the material in the form of the design, comprising a housing part having an outlet opening for communication with said recessed design, a first piston movable in said housing part and forming therewith a first chamber, means for delivering fluid into said first chamber, said first chamber being contracted during movement of said first piston in one direction thereby increasing the fluid pressure in said first chamber, and an outlet valve means carried by said first piston and movable relative thereto by said fluid pressure in a direction opposite the direction of movement of said first piston in contracting said first chamber to effect opening of said outlet opening, said outlet valve means having surface portions against which said fluid pressure acts to effect said movement in said opposite direction, said first piston having a bore therein forming a second chamber adapted to communicate with a fluid supply, and said means for delivering fluid into said first chamber includes means defining at least one opening communicating said chambers, and further including means for restricting fluid flow through said one opening upon movement of said first piston relative to said housing part, and a second piston in said bore and carrying said outlet valve, and said second piston having said surface portion against which the increase in the fluid pressure in said first chamber acts causing movement of said second piston into said bore to effect opening of said outlet opening.*

*3. A feed mechanism as defined in claim 2 wherein said second piston comprises a hollow member connected with said fluid supply, and said outlet valve means comprises a relief valve member movable relative to said second piston to communicate said recessed design with said second chamber when the pressure of the fluid acting on said valve member exceeds a predetermined pressure to thereby provide for pressure relief.*

*4. A feed mechanism as defined in claim 2 wherein said second piston is hollow, and said means defining at least one opening communicating said chambers comprising a*

*portion of said second piston, and said means for restricting fluid flow through said one opening comprises a portion of said first piston which slides relative to said opening.*

*5. A mechanism for use in applying a fluid design onto material comprising a plate having a recessed design therein in accordance with the fluid design to be applied to the material and a passage through the thickness of the plate communicating with said recessed design, a fluid injector unit for delivering a charge of fluid under pressure through said passage to said recessed design when the plate and material are in sealing pressure relationship, said injector unit including a main piston movable in a first chamber to force fluid from said first chamber into said recessed design and means for relieving said pressure of the fluid in said recessed design, said means for relieving the pressure of the fluid in said recessed design comprising a member supported by said piston for yielding movement and having a surface portion exposed to the pressure and which yields in response to a predetermined pressure of the fluid acting thereon to thereby effect said pressure relief, said main piston having a passage therein through which fluid flows, an auxiliary piston located in said passage, said auxiliary piston having a second chamber communicating with said passage in said main piston and through which fluid flows, means communicating said second chamber and said first chamber to provide for fluid flow therebetween, and said member being carried by said auxiliary piston.*

*6. A mechanism as defined in claim 5 wherein said member comprises a valve means movable in response to said fluid pressure and which opens to communicate said recessed design with said first chamber.*

*7. A mechanism as defined in claim 5 wherein said injector unit comprises a housing part having an outlet opening, and said member comprises an outlet valve means for blocking flow of fluid through said outlet opening and movable relative to said main piston to effect opening thereof.*

* * * * *